United States Patent [19]

Downs et al.

[11] Patent Number: 4,558,652
[45] Date of Patent: Dec. 17, 1985

[54] COMBUSTION OF COAL-WATER SLURRIES

[75] Inventors: William Downs; John M. Rackley, both of Alliance, Ohio

[73] Assignee: The Babcock & Wilcox Company, New Orleans, La.

[21] Appl. No.: 739,510

[22] Filed: May 31, 1985

Related U.S. Application Data

[63] Continuation of Ser. No. 561,712, Dec. 15, 1983, abandoned.

[51] Int. Cl.⁴ .............................................. F23D 1/00
[52] U.S. Cl. .................................. 110/347; 110/263; 110/264
[58] Field of Search ................... 110/347, 263, 264

[56] References Cited

U.S. PATENT DOCUMENTS

| | | | |
|---|---|---|---|
| 3,073,652 | 1/1963 | Reichl | 110/347 |
| 3,124,086 | 3/1964 | Sage et al. | 110/264 |
| 3,699,903 | 10/1972 | King | 110/347 X |
| 3,941,552 | 3/1976 | Cottell | 110/347 X |
| 4,380,960 | 4/1983 | Dickinson | 110/347 |

Primary Examiner—Edward G. Favors
Attorney, Agent, or Firm—Robert J. Edwards; Robert C. Mai

[57] ABSTRACT

A method of burning a coal-water slurry capable of being retrofitted to oil and gas fired industrial and utility steam boilers or as original equipment in new units using essentially pure oxygen, oxygen-enriched air or hydrogen-oxygen mixtures as the atomizing fluid in a burner atomizer.

3 Claims, 6 Drawing Figures

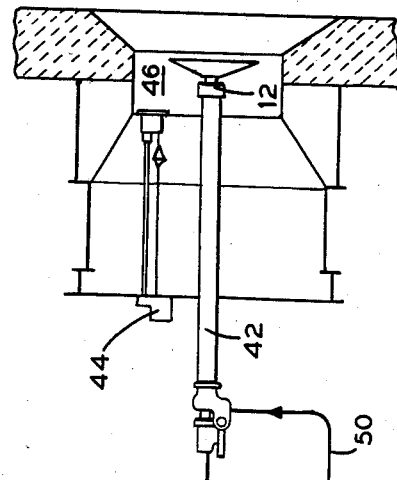
FIG. 3
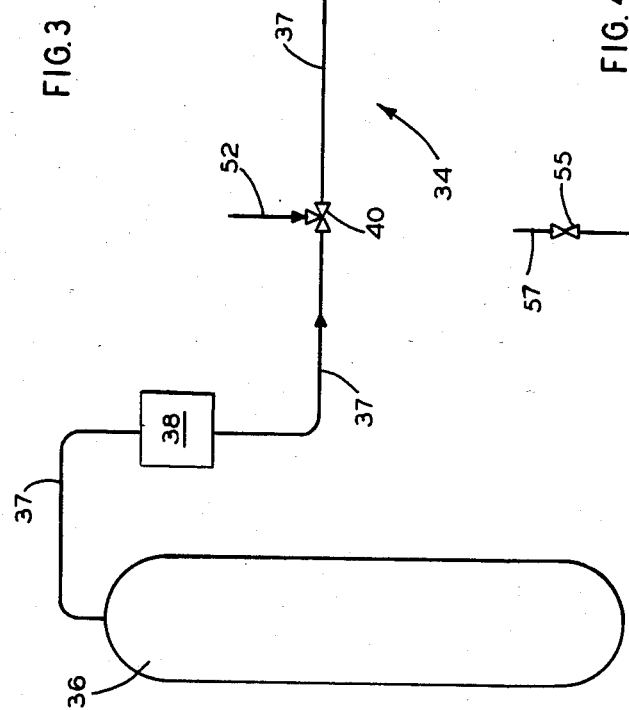
FIG. 4
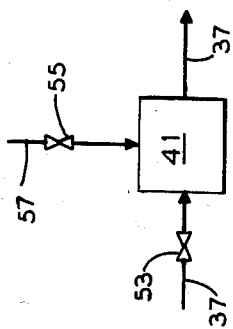

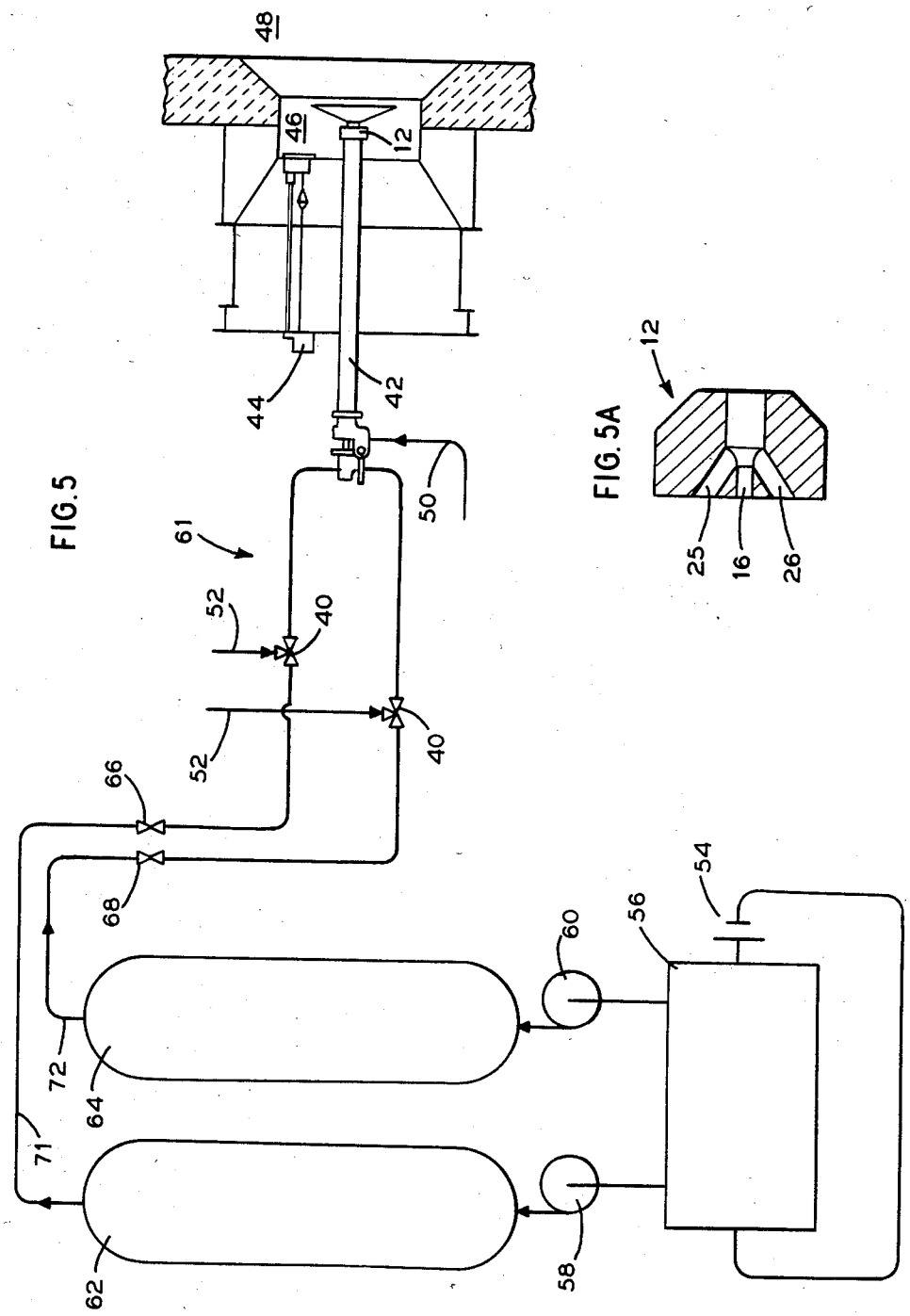

COMBUSTION OF COAL-WATER SLURRIES

This application is a continuation of application Ser. No. 561,712 filed Dec. 15, 1983, now abandoned.

FIELD AND BACKGROUND OF THE INVENTION

National energy goals currently being pursued call for increased utilization of coal for industrial purposes in preference to oil and natural gas. This policy is intended to decrease U.S. dependence on foreign oil and to preserve natural gas supplies for residential use. Recent developments in the search for alternative fuels have been in the successful production of coal-water slurries which may contain 65 to 80 percent dry coal by weight suspended in water. The surprising characteristics of these slurries are that they exhibit good fluidity and stability both in transport and storage and are generally obtained by the use of pulverized coal of a particular particle size distribution for efficient particle packing coupled with the use of certain chemical additives to provide good fluidity and stability. In addition, the slurries can be beneficiated during production by decreasing the ash and sulfur contents of the coal. The substitution of coal-water slurry firing for oil in stream boilers which were originally designed for coal firing but which had been converted to oil and for boilers originally designed for oil firing would provide one solution to our national energy goals.

During the early 1980's, The Babcock & Wilcox Company, assignee of the instant invention, conducted combustion tests at its Alliance, Ohio Research Center to determine the suitability of coal-water slurries as a substitute fuel. A major program involved testing a slurry containing 66 percent solids by weight produced from a beneficiated high volative eastern bituminous coal, using compressed air as the atomizing fluid. The primary objective was to demonstrate that the slurry could be fired in a test unit of $4.0 \times 10^6$ Btu/hr. nominal capacity with only minor modifications to the existing fuel oil handing and firing equipment.

Although the program was generally encouraging, some of the less desirable results can be summarized as follows:

1. Stable ignition could be maintained only in a limited firing range of 3.9 to $4.4 \times 10^6$ Btu/hr.
2. Combustion air temperature of 600 deg. F. was required.
3. Preheating the furnace to operating temperature was needed for successful ignition.
4. Flame temperatures during slurry firing were 200 to 400 deg. F. lower than the equivalent parent coal flame.
5. Flue gas flow rates through the test unit were higher than flow rates using conventional pulverized coal because of the high water content of the slurry.

Clearly, there is a need for improvement in the combustion of coal-water slurries of high solids content particularly with respect to stable ignition over a range of fuel properties and in turndown capability corresponding to variable load demands.

SUMMARY OF THE INVENTION

Oxygen enrichment has been employed in the metallurgical industry and for increased yield in rotary kiln products. However, the use of oxygen, oxygen-enriched air or oxygen-hydrogen mixtures in the atomization and combustion of coal-water slurries as disclosed in this application is novel and, to the inventors' knowledge, is not anticipated by the existing art.

The invention comprises a method of burning a coal-water slurry capable of being retrofitted to oil and gas fired industrial and utility steam boilers or as original equipment in new units using essentially pure oxygen, oxygen-enriched air or oxygen-hydrogen mixtures as the atomizing fluid in a dual-fluid atomizer. The required percentage of oxygen in the oxygen-enriched air depends on the amount of water present in the coal-water slurry, the particle size distribution of coal, the volatile content of coal and certain operating facts, such as heat release rate, heat absorption and load.

Since coal-water slurries are being developed as a substitute for fuel oil in many industrial and utility applications, a satisfactory, dependable method of ignition is an absolute prerequisite. This invention provides a practical means for achieving stable ignition of a coal-water slurry in a cold furnace while minimizing air and furnace preheating. At the present time coal-water slurry ignition by conventional means requires preheating of both the furnace and the combustion air by the use of an auxiliary fuel such as natural gas or fuel oil. When slurries are prepared from low volatile coals, combustion air temperatures in excess of 800 deg. F. have been required in test installations which are beyond the capability of most existing units.

The use of oxygen as the atomizing medium will reduce the total gas flow through the steam generating unit when firing coal-water slurries. For example, using 0.2 lb. of oxygen for atomizing 1 lb. of coal in a slurry will reduce the flue gas flow through the unit to about 90% of that when using air. This reduction in gas flow for the same steam output has the following beneficial effects:

a. The resulting reduction in gas velocity through the convection passes will reduce erosion of heating surfaces.
b. Reduced exit gas flow from the unit will result in higher boiler efficiency.
c. Forced and induced draft fan requirements will be reduced.
d. Flame temperature will be higher to offset the depression of temperature due to the high water content of the slurry.

BRIEF DESCRIPTION OF THE DRAWINGS

FIG. 3 is a schematic of an atomization system, using oxygen as the atomizing fluid.

FIG. 4 is a schematic of the mixing chamber of a atomization system using oxygen-enriched air as the atomizing fluid.

FIG. 5 is a schematic of an atomization system using a hydrogen-oxygen mixture as the atomizing fluid.

FIG. 5A is a schematic of the atomizer for the system of FIG. 5.

DESCRIPTION OF THE PREFERRED EMBODIMENTS

Atomization of fuel oil is generally accomplished with steam or compressed air. No significant difference exists between these two atomizing fluids with respect to either stable ignition or combustion quality. This is probably due in part to the high quality of this fuel. Igniting a fuel, particularly in a cold furnace, is a matter of supplying sufficient heat to the fuel stream so that a cascading thermal effect ensues. Specifically, an electric spark is usually used to ignite an easily ignitable secondary fuel such as natural gas. This flame, in turn, ignites a portion of the primary fuel. If the heat release rate of the ignited portion of the primary fuel is sufficient, it will, in turn, ignite adjacent portions of the primary fuel stream which propagates into full ignition.

The ignition of coal-water slurries in conventional fuel oil burner modes has proven to be difficult. This difficulty has been due in part to the thermal suppressing effect of evaporating water. This problem is particularly aggravated if ignition is attempted in a cold furnace because little radiant energy is available for evaporating water in the main fuel stream. Because of this situation, the heat release rate of that portion of the coal-water mixture receiving direct thermal contact from either an electric spark or a gas flame, will tend to produce insufficient heat to produce the necessary thermal cascading effect and full ignition will not occur.

Figure 1:
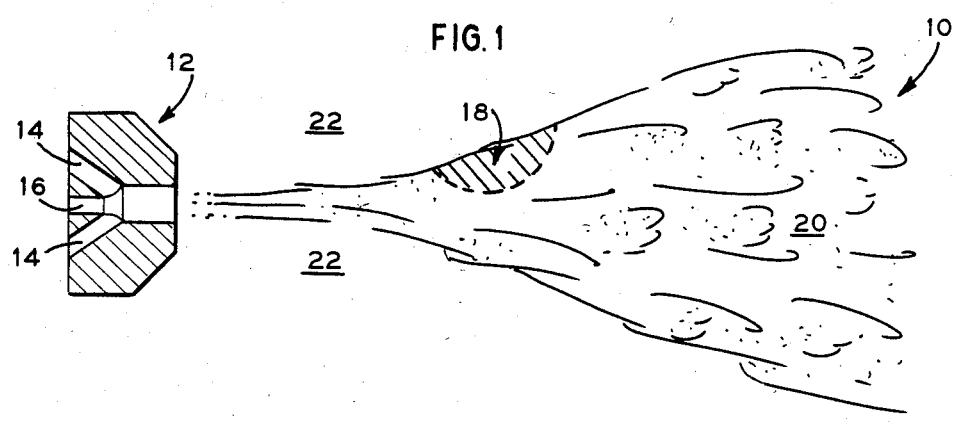
FIG. 1 represents a conventional ignition environment of a coal-water slurry using steam or compressed air as the atomizing fluid.
Figure 2:
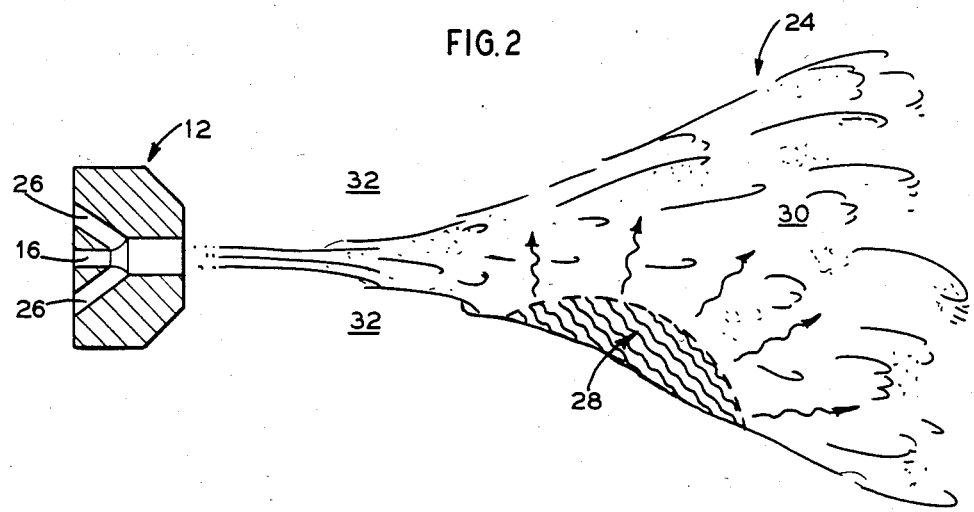
FIG. 2 represents the enhanced ignition environment of a coal-water slurry using oxygen as the atomizing fluid.

One solution to this problem, therefore, is to increase the heat release rate of the coal-water mixture during the initial ignition period. One method by which this can be accomplished is to provide localized zones of high oxygen-fuel concentrations by utilizing essentially pure oxygen for atomization of the fuel. The adiabatic flame temperature of an oxygen-coal flame can exceed 7000 deg. F., compared to a typical air-coal adiabatic flame temperature of less than 4000 deg. F. The higher flame temperature results from not having nitrogen present to act as a thermal sink. Combustion intensity is also greatly increased in an oxygen-coal flame because gas phase diffusion of oxygen to the coal particle is greatly increased due to higher oxygen partial pressure and shorter path length. FIGS. 1 and 2 depict these general principles.

Referring to FIG. 1, a conventional ignition environment 10 is shown for coal-water slurry 16 firing in atomizer 12, using steam or compressed air 14, as the atomizing fluid. Zone 18, produced by an external heat source, is a region of ignition instability due to insufficient heat release to maintain ignition of the main stream 20 consisting of coal, steam and air. Volume 22, surrounding the main stream 20, is a turbulent region of secondary air introduced by known means.

Referring to FIG. 2, an enhanced ignition environment 24 is shown for coal-water slurry 16 firing using essentially pure oxygen 26 as the atomizing fluid. Zone 28, produced by an external heat source, is a region of high heat release which propagates ignition of the main stream 30 consisting of coal, steam and oxygen. Volume 32, surrounding the main stream 30 remains composed of a turbulent region of secondary air and induced circulation of hot furnace gases.

FIG. 3 schematically illustrates an oxygen atomization system 34 using oxygen as the atomizing fluid. Oxygen is stored cryogenically under pressure in tank 36. In use, a flow of oxygen is admitted through conduit 37 to vaporizer 38 and thence via three-way valve 40 to the atomizer assembly 42 for ignition and combustion in furnace 48. The ignitor 44 provides an electric spark to ignite a secondary fuel, not shown, which in turn ignites the primary fuel stream. Secondary air is admitted through plenum 46 and coal-water slurry through conduit 50. A single storage tank 36, approximately 10 ft. in diameter and 39 ft. high will supply the start-up needs for an 800 MW steam generator unit for over an hour at full load on the unit. After the furnace has been warmed to full load operating conditions, the system is switched to its normal method of atomization using steam or compressed air admitted through conduit 52.

FIG. 4 schematically illustrates an alternative embodiment of the invention using oxygen-enriched air as the atomizing fluid. The equipment arrangement would be similar to FIG. 3 with the exception that a mixing chamber 41 is located upstream of the three-way valve 40. Control valves 53 and 55 are added to conduits 37 and 57, respectively, to regulate the flow of oxygen and air to the mixing chamber 41 to maintain the desired percentage of oxygen in the oxygen-enriched air.

FIG. 5 schematically illustrates another alternative embodiment 61 of the invention using a hydrogen-oxygen mixture as the atomizing fluid. Hydrogen and oxygen gas are stored under pressure in tanks 62 and 64, respectively. An electric source 54 is connected to a bank of hydrogen and oxygen cells 56 and a water source, not shown, to generate hydrogen and oxygen by the electrolysis of water. The hydrogen and oxygen gases are thence pressurized by the compressors 58 and 60 and stored in the tanks 62 and 64. Control valves 66 and 68 regulate the flow of hydrogen and oxygen admitted to atomizer 12 via conduits 71 and 72 to maintain the desired ratio of hydrogen to oxygen in the atomizing fluid. The remainder of the equipment in FIG. 5 is similar to that schematically shown and described with reference to FIG. 3. Because of the explosive nature of a mixture of hydrogen and oxygen, for safety considerations these gases are kept separate in conduits 71 and 72 and are mixed only at the atomizer 12 to atomize the coal-water slurry 16. FIG. 5A schematically represents the atomizer 12 for this arrangement showing the separate ports 25 and 26 for hydrogen and oxygen respectively.

The use of a combustible mixture of atomizing gases enhances ignition of the main fuel stream by ignition of these gases within the main fuel stream providing a wide and intimately mixed ignition region within the coal-water atomized fuel stream with consequent high heat release for stable ignition.

Hydrogen and oxygen cells commercially available operate at near theoretical yields of the gases. Hydrogen and oxygen flames yield adiabatic temperatures of 5385 deg. F. and emit radiation at a wavelength of 3064 Å. This wavelength is readily absorbed by pulverized coal. Commercial cells produce on the order of 7.6 cu. ft. of hydrogen ( and thus 3.8 cu. ft. of oxygen) per KWH. Combustion of hydrogen yields 275 Btu per cu. ft. and an efficiency of electrical conversion to heat of combustion of approximately 61%.

An important factor in the combustion of coal-water slurries concerns the placement of the external heat source relative to the expanding fuel-water stream leaving the atomizer. Coal-water slurry creates a unique ignition problem. Upon leaving the atomizer no ignition is possible so long as all of the coal particles are moistened by water. A coal particle must first dry before ignition and combustion becomes possible. Therefore, the point of ignition must be sufficiently downstream of the atomizer so that some of the coal particles have dried. However, if the ignition point is too far downstream of the atomizer where the atomized coal-water stream has diverged significantly, oxygen enrichment will have diminished substantially due to entrainment of combustion air around the atomizer. Therefore, a critical region exists where sufficent coal has dried but entrainment has not yet severely diluted the atomizer oxygen to permit enhancement of the ignition process to take place. It is evident that a hydrogen-oxygen mixture would be effective over a wider region of the diverging fuel stream because combustion can occur not just with the coal particle, but between the two atomizing fluids as well. A further advantage of the use of hydrogen-oxygen mixtures produced from the electrolysis of water as an atomizing fluid resides in the fact that these gases are generated at stoichiometric ratios and can be combusted at stoichiometric ratios. It shoud be understood, however, that it is not necessary to maintain the stoichiometric ratio as long as the oxygen content is sufficient to maintain the adiabatic temperature required for stable ignition and flame propagation. The mixture has its own oxidant and is independent of air from the burner for combustion under conditions of stoichiometric ratios.

The foregoing description has been directed to particular preferred embodiments of the present invention for purposes of explanation and illustration. It should be recognized, however, by those skilled in the art that modifications and changes in the invention may be made without departing from the scope and spirit of the invention. It is therefore intended that the following claims cover all equivalent modifications and variations as fall within the scope of the invention as defined by the claims.

The embodiments of the invention in which an exclusive property or privilege is claimed are defined as follows:

1. A combustion process for achieving stable ignition of coal-water slurries during start-up of industrial and utility steam generators comprising:
   introducing essentially pure oxygen in a dual-flow atomizer;
   introducing a coal-water slurry in a dual-flow atomizer; atomizing and igniting the slurry, and
   switching from essentially pure oxygen to a conventional atomizing fluid after stable ignition of the slurry.

2. A combustion process for achieving stable ignition of coal-water slurries during start-up of industrial and utility steam generators comprising:
   introducing oxygen-enriched air in a predetermined ratio in a dual-flow atomizer;
   introducing a coal-water slurry in a dual-flow atomizer; atomizing and igniting the slurry, and
   switching from oxygen-enriched air to a conventional atomizing fluid after stable ignition of the slurry.

3. A combustion process for achieving stable ignition of coal-water slurries during start-up of industrial and utility steam generators comprising:
   introducing hydrogen and oxygen to separate ports in a burner atomizer;
   introducing a coal-water slurry in a burner atomizer; atomizing and igniting the slurry, and
   switching from hydrogen and oxygen to a conventional atomizing fluid after stable ignition of the slurry.

* * * * *